US007821966B2

(12) United States Patent
Beygelzimer et al.

(10) Patent No.: US 7,821,966 B2
(45) Date of Patent: Oct. 26, 2010

(54) METHOD AND APPARATUS FOR NETWORK TOPOLOGY DISCOVERY USING CLOSURE APPROACH

(75) Inventors: Alina Beygelzimer, White Plains, NY (US); Shang Q. Guo, Cortlandt Manor, NY (US); Sheng Ma, Briarcliff Manor, NY (US); Natalia Odintsova, Elmsford, NY (US); Irina Rish, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 11/687,750

(22) Filed: Mar. 19, 2007

(65) Prior Publication Data
US 2008/0232262 A1 Sep. 25, 2008

(51) Int. Cl.
H04L 12/28 (2006.01)
H04L 1/00 (2006.01)
H04L 12/26 (2006.01)
G01R 31/08 (2006.01)
G06F 11/00 (2006.01)
G08C 15/00 (2006.01)
H04J 1/16 (2006.01)
H04J 3/14 (2006.01)

(52) U.S. Cl. ........................ 370/254; 370/247; 370/248; 370/251; 370/252; 370/255

(58) Field of Classification Search ........................ None
See application file for complete search history.

(56) References Cited

U.S. PATENT DOCUMENTS 5,185,860 A * 2/1993 Wu .............................. 709/224
6,498,782 B1 * 12/2002 Branstad et al. .............. 370/231
7,263,552 B2 * 8/2007 Govindarajan et al. ....... 709/224
2005/0007963 A1 * 1/2005 Huang et al. ................. 370/255
2005/0047350 A1 * 3/2005 Kantor et al. ................ 370/254

OTHER PUBLICATIONS

R. Siamwalla et al., "Discovering Internet Topology," Proceedings of the IEEE Infocom, 1999, pp. 1-16, New York.
B. Huffaker et al., "Topology Discovery by Active Probing," Symposium on Applications and the Internet (SAINT), 2002, pp. 1-8, California.

(Continued)

Primary Examiner—Daniel J Ryman
Assistant Examiner—Andrew Oh
(74) Attorney, Agent, or Firm—Lou Percello; Ryan, Mason & Lewis, LLP (57) ABSTRACT

Improved network topology discovery techniques. For example, an automated method for discovering a topology of a network, having a plurality of nodes, includes the following steps. A first traceroute process is performed for a given source node and one or more destination nodes listed in a target list so as to discover one or more paths through one or more intermediate nodes between the given source node and the one or more destination nodes. The one or more intermediate nodes discovered during the first traceroute process are added to the target list. A second traceroute process is performed for the given source node and the one or more intermediate nodes discovered during the first traceroute process so as to discover one or more paths through one or more additional intermediate nodes between the given source node and the one or more intermediate nodes discovered during the first traceroute process.

18 Claims, 9 Drawing Sheets

OTHER PUBLICATIONS

Y. Hyun et al., "On Third-Party Addresses in Traceroute Paths," Passive and Active Measurement Workshop (PAM), 2003, 10 pages, California.

R. Govindan et al., "Heuristics for Internet Map Discovery," Proceedings of the IEEE Infocom, 2002, pp. 1-11, California.

B. Cheswick et al., "Mapping and Visualizing the Internet," Proceedings of the 200 Usenix Annual Technical Conference, Jun. 2000, 12 pages.

I. Rish et al., "Real-Time Problem Determination in Distributed Systems Using Active Probing," Network Operations and Management Symposium (NOMS), Apr. 2004, 14 pages, vol. 1, New York.

B. Lowekamp et al., "Topology Discovery for Large Ethernet Networks," ACM Sigcomm Conference, Aug. 2001, pp. 237-248, California.

A. Lakhina et al., "Sampling Biases in IP Topology Measurements," INFOCOM 2003, Twenty-Second Annual Joint Conference of the IEEE Computer and Communications Societies, Apr. 2003, 10 pages, vol. 1, Boston.

A. Reddy et al., "Large-Scale Fault Isolation," IEEE Journal, May 2000, pp. 1-24, vol. 18, Issue 5, California.

* cited by examiner

FIG. 1A

Input: source nodes $S=\{S_1,...,S_k\}$ and target nodes $T=\{T_1,...,T_n\}$
Output: discovered graph $G=\{C, E\}$, C is the overall node 'closure'
Initialize: $C_0=T$, $E_0=\{\}$  /* initial closure contains only targets */ i=0; /* iteration */
j=0; /* source index */
do{
   i = i+1; j = j+1;
   if j>k j=1; /* source index must be between 1 and k */
   $\{C_i, E_i\}$=getClosure($C_{i-1}$, $E_{i-1}$, $S_j$)
} while ($C_i \neq C_{i-1}$)

Return $G=\{C_i, E_i\}$

FIG. 1B

- Nodes = targetSet, Edges = currentEdges
- For every T in Nodes, label T 'not processed'
- For every T in Nodes:
  1. If T is not "processed", destination_ip = T
  2. Tracert from source to destination_ip, Obtain the path P
  3. For every edge Y on path P, Y not in Edges, add Y to Edges
  4. For every X in P, if X is not in Nodes, add X to Nodes
  5. Mark T 'processed'
  6. repeat 1-5 until all T in Nodes are 'processed'
- Return {Nodes, Edges}

The closure originated from source 9.2.24.226.

FIG. 2B

The closure originated from source 9.2.122.24.

FIG. 2C

C1=C(T,S1), where T= {9.2.4.6, 9.2.112.69}, S1= 9.2.24.226

FIG. 2D

C2 = C(C1,S2), where S2= 9.2.176.214

METHOD AND APPARATUS FOR NETWORK TOPOLOGY DISCOVERY USING CLOSURE APPROACH

FIELD OF THE INVENTION

The present invention generally relates to computing networks and, more particularly, to techniques for discovering topologies of such networks using a closure-based discovery approach.

BACKGROUND OF THE INVENTION

Accurate information about a topology of a computer network is essential for system management tasks such as problem determination and performance analysis. However, this information is not always readily available, even within the boundaries of a company, especially if the intranet of the company is very large and consists of multiple subnetworks that are managed by different organizations. It is known that combining such information manually from multiple sources, and especially keeping it up to date, turns out to be quite tedious and time consuming. Moreover, collecting such information becomes even more complicated for the Internet, where different parts of the network are owned by different organizations.

Currently, there are two common approaches to Internet structure discovery. One approach collects information from Border Gateway Protocol (BGP) inter-domain routing tables, and the other approach actively probes Internet Protocol (IP) addresses to trace the actual paths that packets traverse from source to destination.

Some examples of techniques in the latter approach are as follows. The approach of R. Siamwalla et al., "Discovering Internet Topology," IEEE INFOCOM '99, pp 1-16, 1999, uses several heuristics and algorithms to discover network topology. The basic idea described in their work is to start from some initial set of IP addresses, and iteratively expand this set to obtain additional IP addresses, until all addresses are discovered.

The procedure for expanding the current set of addresses is based on the assumption that network services (such as Simple Network Management Protocol (SNMP), broadcast ping, Domain Name Service (DNS) zone transfer, etc.) are enabled and users have the access privilege to use them. Using network services can help to create more accurate topology maps. Many researcher and commercial tools for network discovery rely on these services, in particular on the information provided by SNMP. These tools include OpenView from Hewlett Packard, Tivoli from IBM Corporation, Intermapper from Dartware, and Netviz products.

A similar technique can also be used for the multicast overlay network of the Internet, i.e., the M-Bone, as described in A. Reddy et al., "Large-Scale Fault Isolation," IEEE Journal of Selected Areas in Communication Special Issue on Network Management, 2000. Routers on the M-Bone can request a list of neighbor routers through the services. However, using this approach requires running SNMP service on every node from which information is to be obtained, which can be expensive. Also, network administrators can be reluctant to provide this service because of excessive load (or even potential denial-of-service attacks). Thus, not all the nodes in a given network may be SNMP-enabled.

Other works such as are described in B. Huffaker et al., "Topology Discovery by Active Probing, Symposium on Applications and the Internet (SAINT)," 2002 and in B. Cheswick et al., "Mapping and Visualizing the Internet," Proceedings of the 2000 USENIX Annual Technical Conference, June 2000, use traceroute style packets to map outgoing paths from a single source or multiple sources to each of the targets on the Internet.

As is known, a traceroute utility works by increasing the "time-to-live" (TTL) value of each successive batch of packets sent. The first three packets have a TTL value of one (implying that they make a single hop—a hop being a traversal of one or more packets from one node to another node). The next three packets have a TTL value of two, and so on. When a packet passes through a host node, normally the host decrements the TTL value by one, and forwards the packet to the next host. When a packet with a TTL of one reaches a host, the host discards the packet and sends an Internet Control Message Protocol (ICMP) time-exceeded packet to the sender. The traceroute utility uses these returning packets to produce a list of hosts, in terms of hops, that the packets have traversed en route to the destination.

However, using only source-destination traceroutes does not always give complete information about the topology, and may result in biased sampling, especially if the number of sources is small.

Accordingly, a need exists for improved network topology discovery techniques.

SUMMARY OF THE INVENTION

Principles of the present invention provide improved network topology discovery techniques.

For example, in one aspect of the invention, an automated method for discovering a topology of a network, having a plurality of nodes, includes the following steps. A first traceroute process is performed for a given source node and one or more destination nodes listed in a target list so as to discover one or more paths through one or more intermediate nodes between the given source node and the one or more destination nodes. The one or more intermediate nodes discovered during the first traceroute process are added to the target list. A second traceroute process is performed for the given source node and the one or more intermediate nodes discovered during the first traceroute process so as to discover one or more paths through one or more additional intermediate nodes between the given source node and the one or more intermediate nodes discovered during the first traceroute process. When one or more additional intermediate nodes are discovered as a result of performance of the second traceroute process, the one or more additional intermediate nodes are added to the target list and the traceroute process is repeated to determine the existence of any further intermediate nodes. When no new intermediate nodes are discovered as a result of performance of the second traceroute process or a subsequent traceroute process, the nodes in the target list are identified as a target closure set for the given source node.

The target closure set for the given source node may be used as an initial target set for a next source node such that one or more traceroute processes can be performed to determine a target closure list for the next source node. A target closure set may be generated for each subsequent source node selected in the network until the target closure set for the current source node is equal to the target closure set for the next source node. When the target closure set for the current source node is equal to the target closure set for the next source node, the target closure set for the current source node represents an overall closure set for the network. The overall closure set may be used to create a topology map of the network, which can be displayed, and updated as one or more target closure sets are updated.

In another aspect of the invention, an automated method for discovering a topology of a network, having a plurality of nodes, includes the following steps. An initial target set is sent to a first source node such that the first source node runs a closure algorithm, beginning with the initial target set, which iteratively executes multiple traceroute processes until no new target nodes are discovered resulting in a closure target set for the first source node. The closure target set is collected from the first source node. The closure target set collected from the first source node is sent to a second source node for use as an initial target set to be used to run the closure algorithm so as to generate a closure target set for the second source node. The closure target set is collected from the second source node. The sending and collecting steps are continued for one or more other source nodes until the closure target set returned for the current source node is the same as the closure target set for the previous source node thus resulting in an overall target closure set.

The overall target closure set may be analyzed. A topological representation of the network may be generated using the overall target closure set. The topological representation of the network may be displayed, and updated when the overall target closure set changes.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Principles of the invention will be described below using a trace-based approach to discovering network topology. In particular, principles of the invention provide a closure methodology that allows for a more complete discovery of the underlying network structure than allowed by existing approaches. It has been realized that such a closure methodology is significantly more accurate than existing approaches, especially if used from multiple sources. The inventive approach overcomes limitations of existing topology discovery methods and provides an automated way of discovering an accurate network topology map.

In one illustrative embodiment, such an inventive approach provides for distributed continuous collection of topological data from multiple servers, and provides this data in a form that facilitates the analysis of network topology dynamics.

Several advantages flow from such an inventive approach. For example, the methodology only uses minimal services that are available on all nodes. The methodology does not require any additional services to be enabled on a node that are not controlled by the methodology. For example, the inventive methodology does not require that each node from which information is to be obtained be SNMP-enabled. Further, the closure methodology discovers a more complete set of nodes and edges than previously proposed approaches based on a traceroute utility.

As used herein, a "node" refers to a device (e.g., a router) in the network to/from which a packet may be routed. The term "edge" refers to a communication path or link between two nodes.

Principles of the invention provide a methodology to discover network maps in an IP-level using a trace-based tool, which we call the closure algorithm. The algorithm starts from a given source node (source), and a relatively small set of target nodes (targets). The targets are identified on a target list. The algorithm obtains the path information from the given source to targets by running traceroutes. The actual process for running traceroutes is well known and, for the sake of clarity, is not further described in detail herein.

Then, the routers (nodes) discovered on these source-destination paths are added to the target list, and the traceroutes are sent to the new targets, and so on. The process stops when there are no new targets found. The nodes in the target list form a node closure set. Next, the process can move to the next source and use the closure set from the previous source as a target list for the next source. The iterative process eventually terminates when the closure set for the current source is equal to the closure set for the next source, which is actually an overall closure set.

The concept of closure as provided herein is, at least in part, motivated by the observation that sometimes a traceroute to an intermediate node X on a previously discovered path P to a target Y does not always follow a subpath of P, and can in fact go through some other nodes not discovered before. Therefore, the algorithm keeps tracing down all the intermediate nodes in order to generate more new paths and new nodes, until the process converges. The nodes are all related directly/indirectly to the initial destinations.

Meanwhile, we also find that if we use the closure set (the closure) obtained from the previous source as a target list for the next source, the closure is often expanded as well. All of these features indicate that using the closure can help to find more nodes and edges within limited resources.

Furthermore, we observed that even with the same target list, using a different source at different times may yield different topology maps. This suggests that it would be advantageous to merge all the traceroute data, obtained by the iterative closure algorithm of the invention, from all available sources obtained at different times.

Our analysis shows that our approach to network discovery introduces significantly less bias than existing approaches based on simply combining routing trees from multiple nodes. In particular, existing approaches severely underestimate edges in the discovered subnetwork. The bias introduced by such approaches may have a dramatic effect on the efficiency of, for example, diagnostic algorithms on the discovered network. We show that our algorithm alleviates such problems.

Figure 1A:
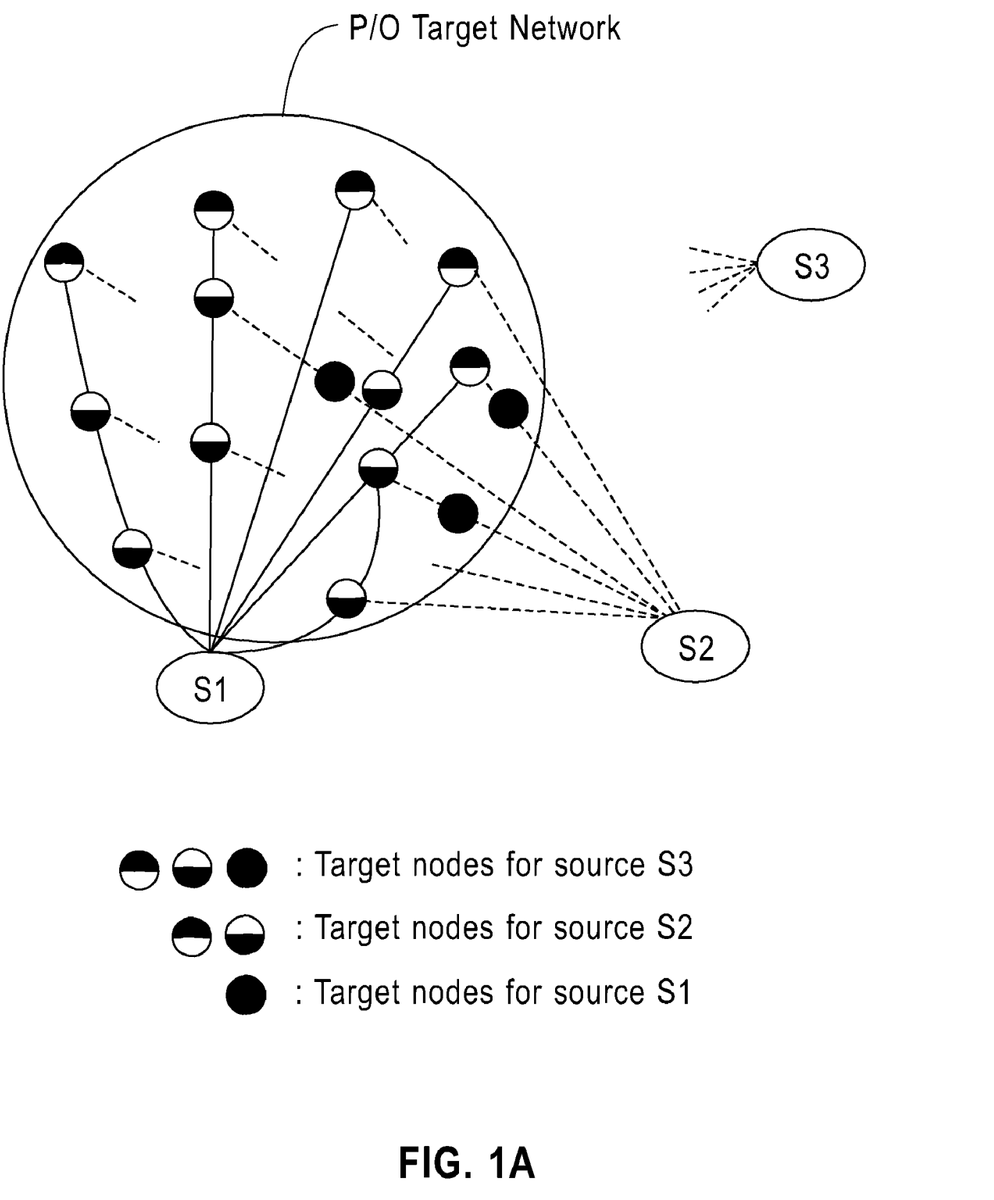
FIG. 1A is an illustration of operation of a closure algorithm according to an embodiment of the invention.

An illustration depicting how the closure algorithm works is shown in FIG. 1A. The algorithm starts with an initial target (or destination) list and uses a traceroute utility to find router adjacencies (connection paths through intermediate nodes) from the source node to each target in the list. The traceroute utility may be any existing traceroute tool, e.g., the traceroute command available in the Windows operating system or in the Linux operating system. Then, the newly discovered nodes on the adjacencies will be added to the target list again until all nodes in the target list are processed. This set of nodes in the target list form a node closure (in a saturation state).

Here we formally define Cn=C(T, Sn) as the closure for Sn and T, where Sn is the source node and T is the target set. The closure for the previous source in turn will be a target list for the next source. Thus, as depicted in FIG. 1A, the closure for S1 is used as part of the target list for S2. The closure, C2, according to the definition, becomes C(C(T,S1),S2)=C(C1, S2). C is monotonically increasing. Once the algorithm goes over all sources from S1 to Sn (in this example, S3), it may continue taking Cn as a target set to update C1. At this time, the algorithm only needs to trace for those nodes in the difference set (Cn-C1). The iteratively updating process will eventually terminate when the current closure Ci is equal to the next closure Ci+1, which is actually an overall closure. The resulting map is depicted graphically based on the overall closure and its adjacencies.

Figure 1B:
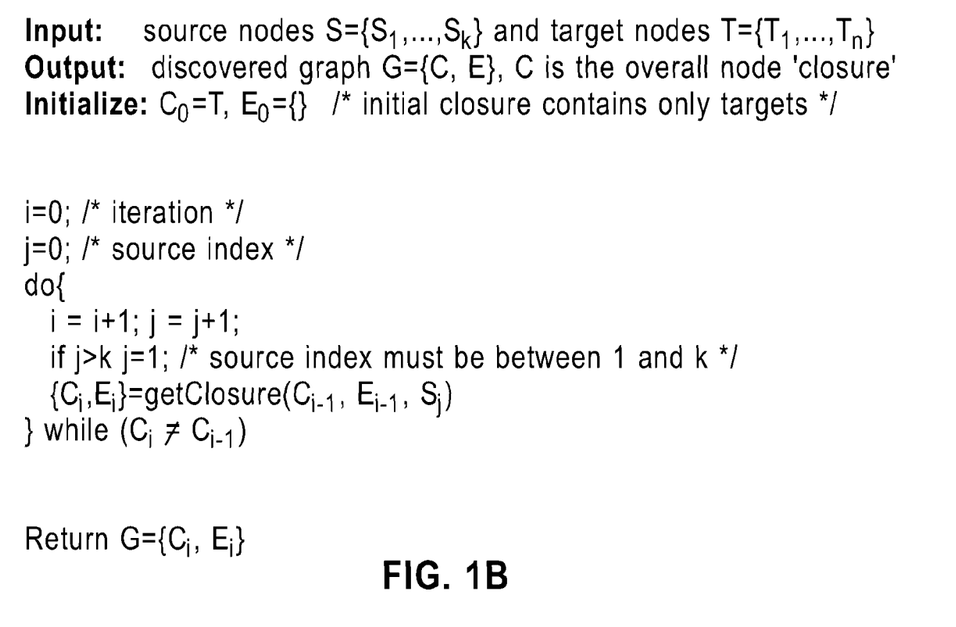
FIG. 1B is a code implementation of a closure algorithm according to an embodiment of the invention.
Figure 1C:
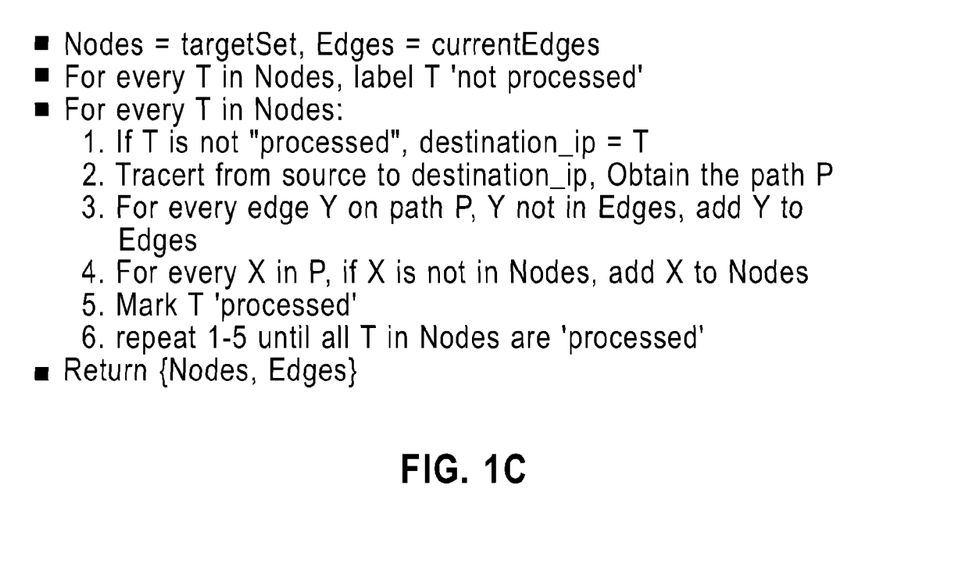
FIG. 1C is a code implementation of a getClosure subroutine of the closure algorithm of FIG. 1B.

FIGS. 1B and 1C depict a code implementation of the closure algorithm described above. FIG. 1B depicts the overall algorithm, while FIG. 1C depicts the getClosure subroutine.

One reason for using the closure concept is that we find that if we trace the intermediate node, which appears on the path of the tracing for a destination, the path may not be the partial path of the previous one. Therefore, we keep tracing down all the intermediate nodes with the purpose of generating more new paths and new nodes, then do the same to these new nodes, until no more new nodes are generated. The nodes are all related directly/indirectly to the initial destinations. Meanwhile, we also find that when using C(T, S1) as a target list for S2 instead of just T, the closure of S2 is expanded. All of these realizations indicate using the closure concept will help to find more possible nodes and edges within limited resources. The other interesting thing we observed that even with the same target list, using different source at the different time will obtain very different topology map. This implies combining or merging all the trace route data from all available sources at all times will give a more complete map.

To capture more details of the network structure, we have developed some utilities and define an extended adjacency list to record while tracing the nodes. It is to be understood that an adjacency list specifies all links (direct node-to-node connections) in a network, while the target list only specifies the final destinations of requested traceroutes. The extended adjacency list contains sources and time stamps for each edge. The algorithm will run for a particular period of time (e.g., 24 hours) and monitor the network dynamic changes from multiple sources. Once the algorithm finds new edges, it adds the edges with the source and the time to the adjacency list. When the algorithm finishes tracing, these adjacency lists will be merged to an overall list and the statistics data are ready for an analysis process. With the overall list, the analysis process can easily retrieve the data so as to know the characteristics of the network, get to know all edges discovered so far, which edges are shared by which sources, which path the trace route might take at the particular time, etc.

Such an extended list with sample data is formatted as follows:

```
9.2.2.6 9.2.1.14{9.2.122.24/11:03:23 9.2.24.226/12:03:02}
9.2.1.6{9.2.122.24/12:03:05} 9.2.4.17 {9.2.24.226/02:03:02}
```

The format above can be interpreted as: u1 v1 {s1/t1 s2/t2} v2{s1/t3} v3{s2/t4}.

Here, edge u1->v1 is found at t1 from source s1, also found at t2 from source s2, edge u1->v2 is found at t3 from source s1 and u1->v3 is found at t4 from source s2.

To collect the trace route information to the targets from the designated sources, we developed a utility for the source node (machine). Running this utility sets up the source machine as a socket server first, then the source listens on the port. Once receiving the requests from a remote analysis center, the source runs the algorithm to generate adjacencies and send adjacencies back to the center via socket. The analysis center receives the results from one source and issues a request to the next source.

Figure 2A:
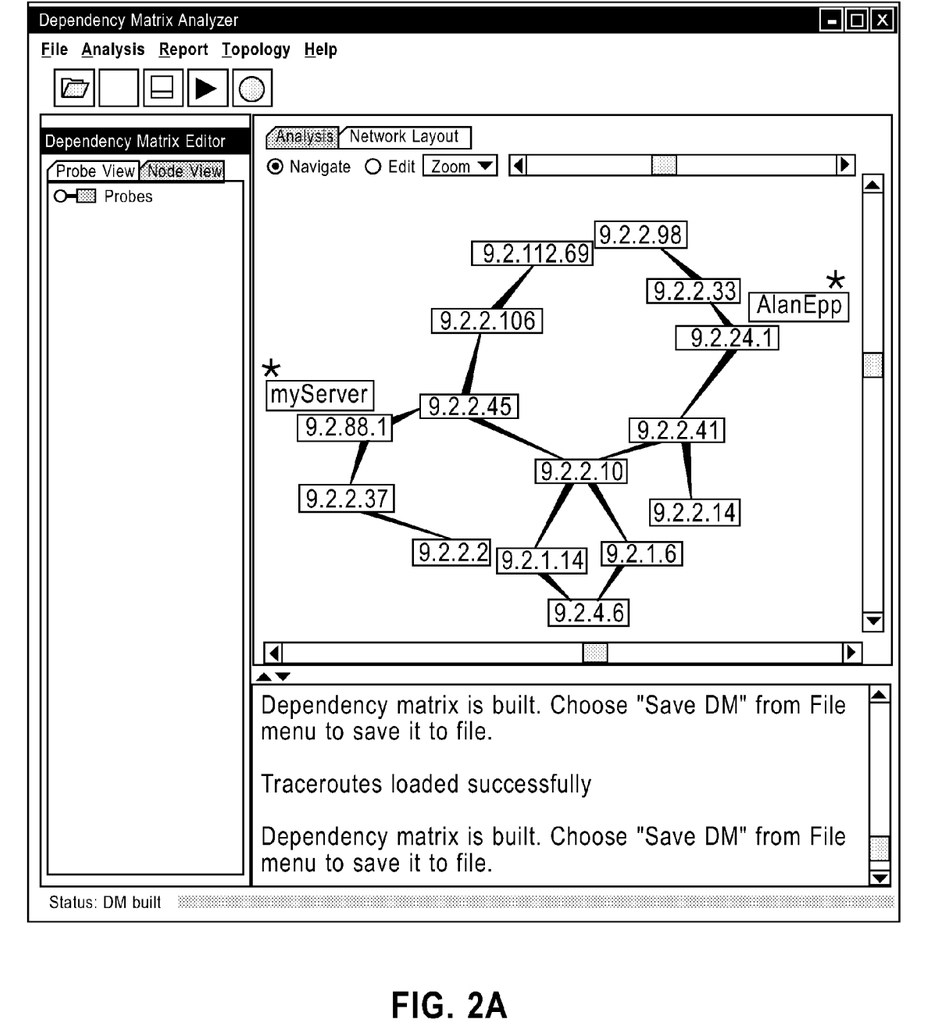
FIGS. 2A through 2H are views of various topology maps and closure sets generated as a result of execution of a closure algorithm according to an embodiment of the invention.
Figure 2B:
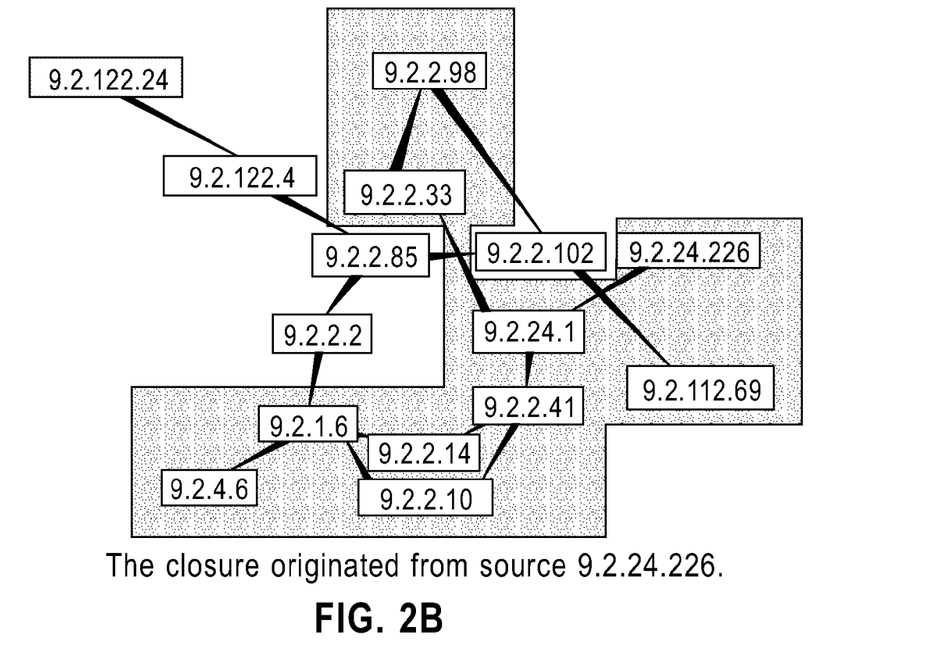
Figure 2C:
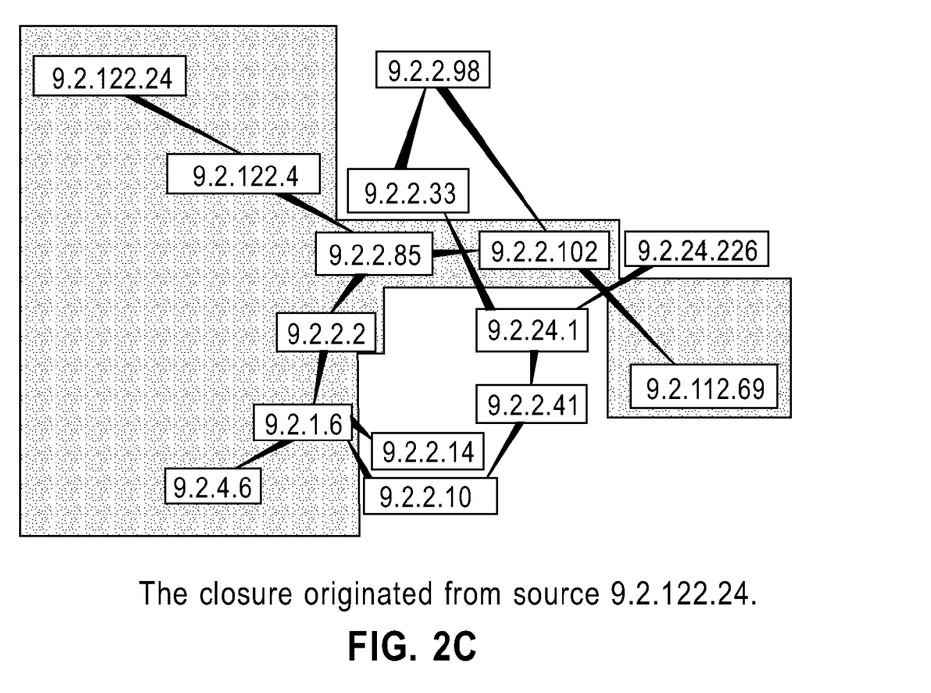
Figure 2D:
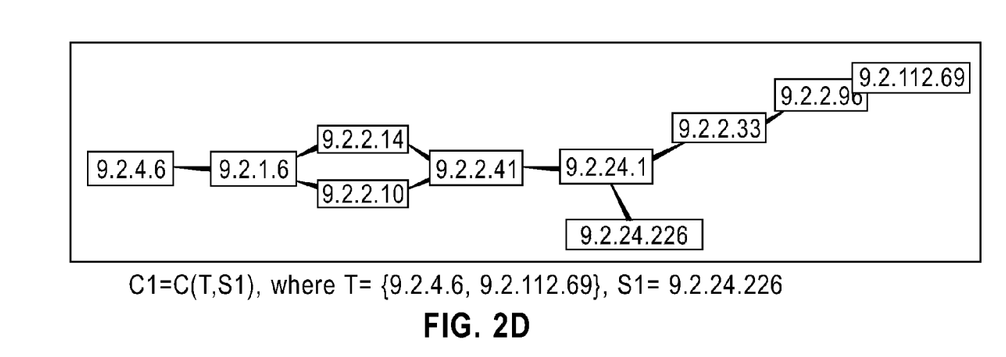
Figure 2E:
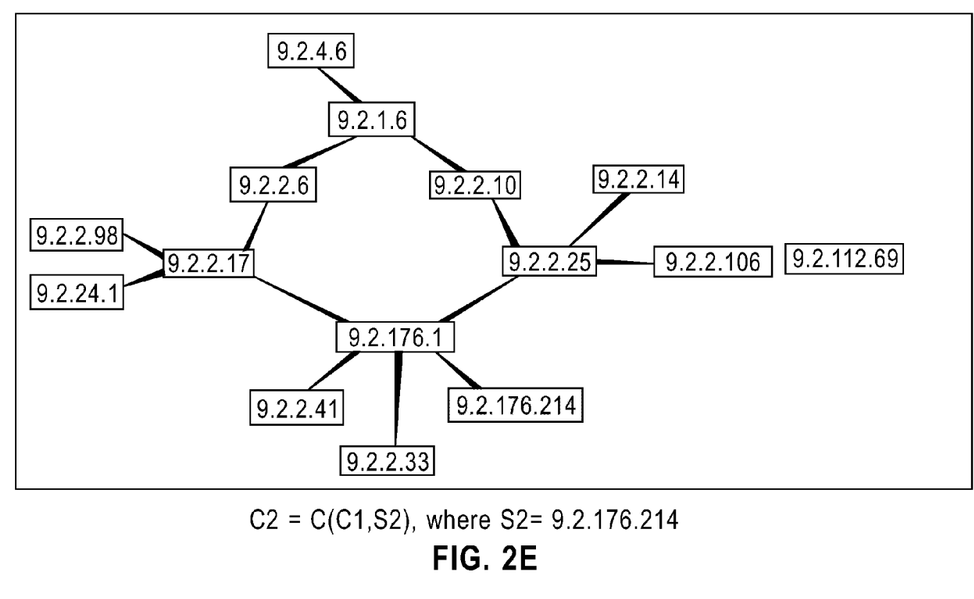
Figure 2F:
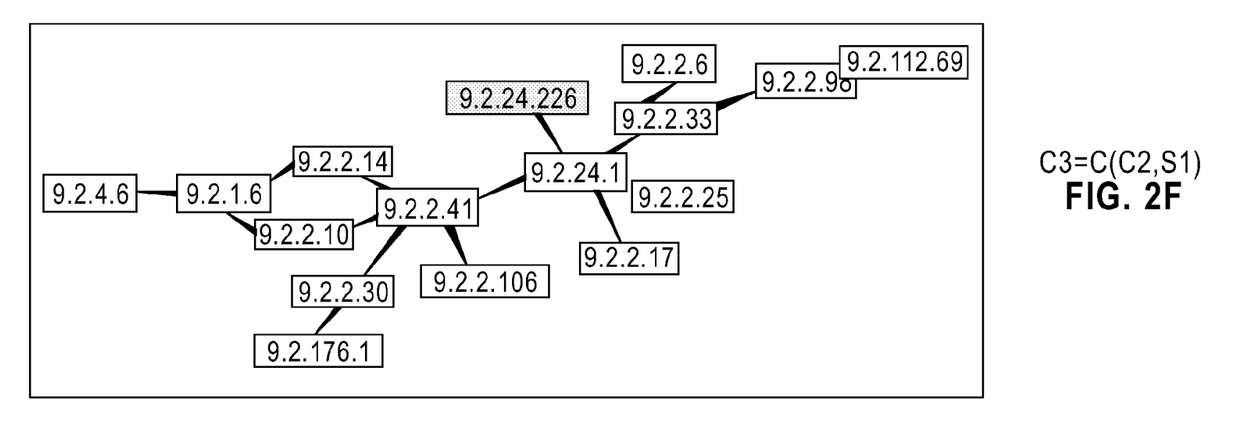
Figure 2G:
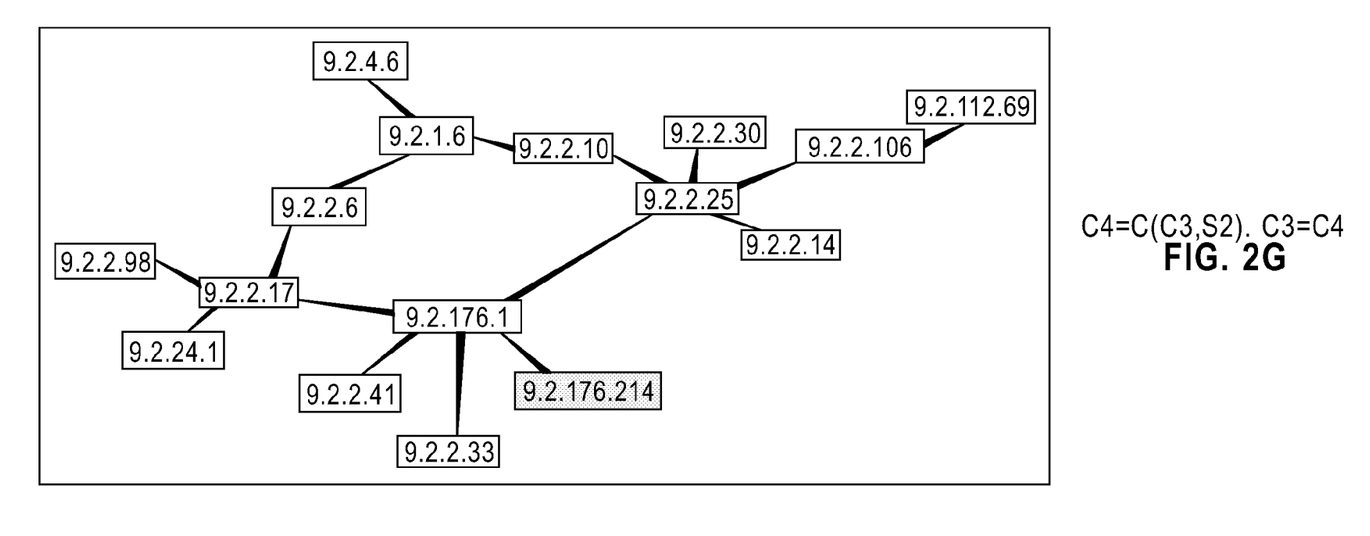
Figure 2H:
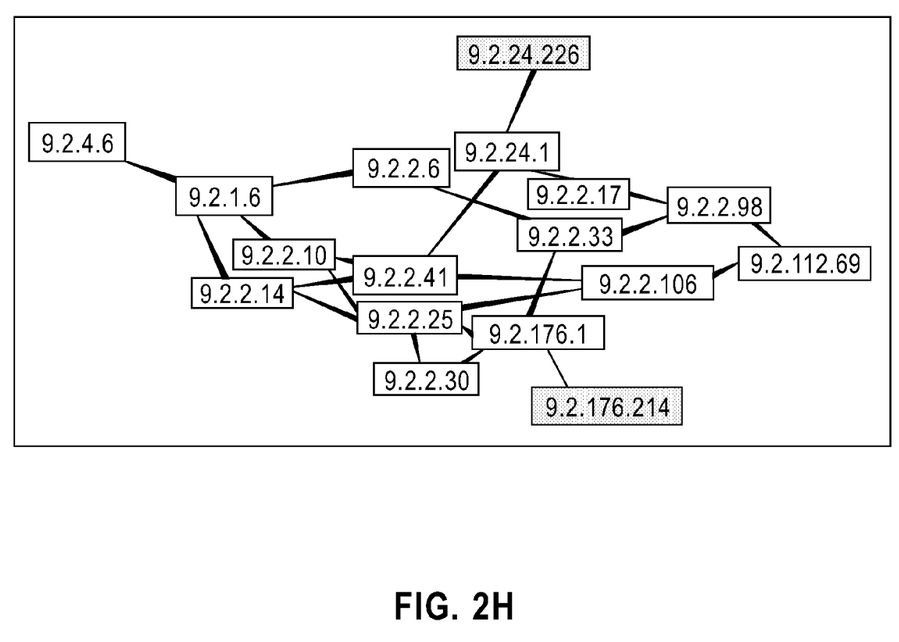

The analysis center gradually builds up a topology map that is displayable via a graphical user interface, which is shown in FIG. 2A. The nodes with asterisks are the source nodes. FIGS. 2B and 2C show an example of how different the map is from one source to another even with the same target list. The target list contains two nodes, 9.2.112.69 and 9.2.4.6. The traceroute tool collects the paths from the source to the targets and intermediate nodes generated. FIG. 2B displays the node closure and the edges with source 9.2.24.226 in the shaded area. FIG. 2C shows the node closure but with another source 9.2.122.24 in the shaded area. From the figures, it is clear that these sources have not much overlapping except for the target nodes and 9.2.1.6. FIGS. 2D through 2G show a series of closures. The merged map from two closures originated from both source 9.2.176.214 and 9.2.24.226 respectively is shown in FIG. 2H.

Figure 3:
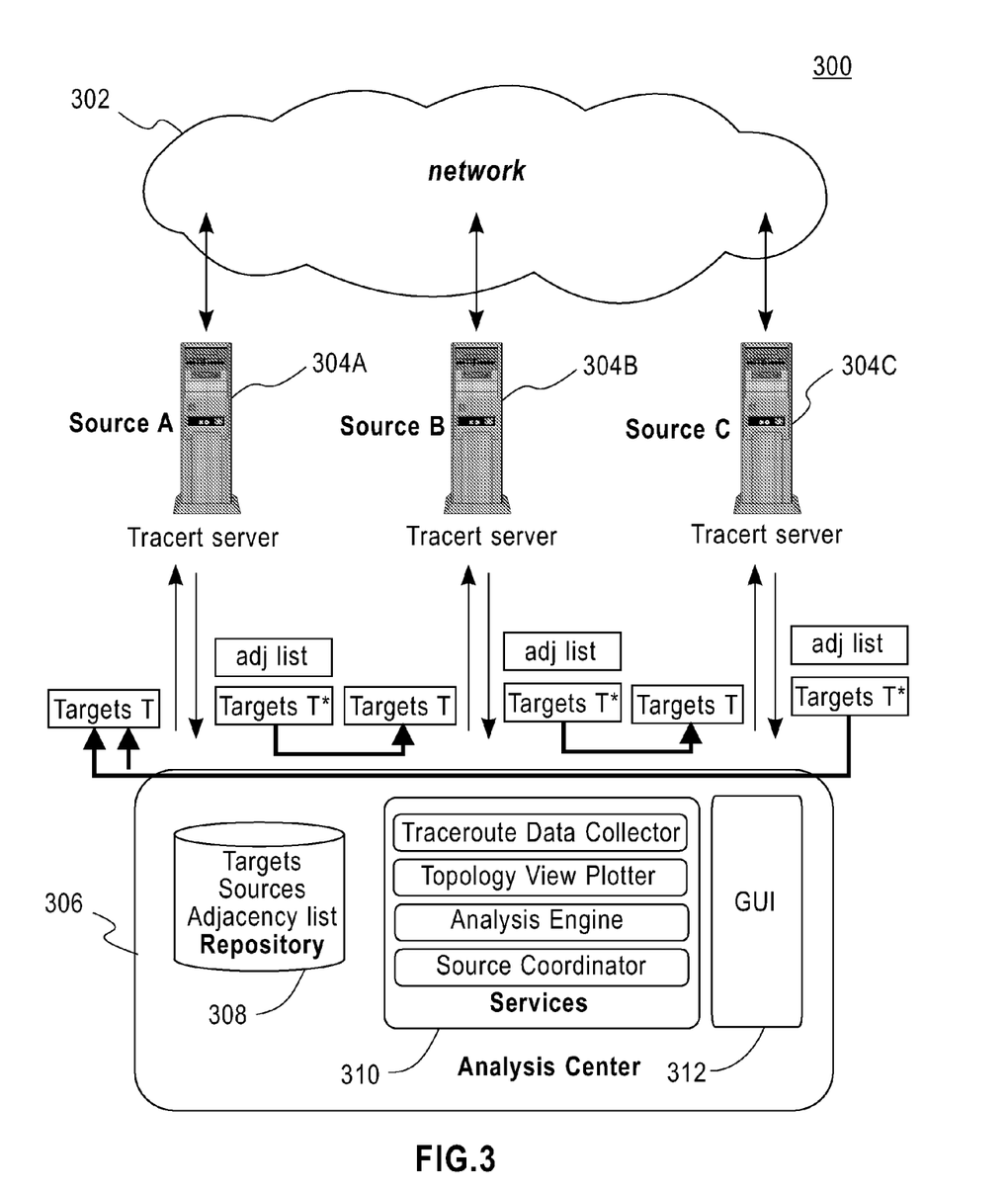
FIG. 3 is a diagram of a system for discovering a topology of a network using a closure algorithm according to an embodiment of the invention.

FIG. 3 illustrates a system 300 for discovering a topology of a network using the closure algorithm of the invention. By way of example, FIG. 3 depicts a network 302, for which a network topology is to be discovered, sources 304-A, 304-B and 304-C (sources A, B and C, respectively), and analysis center 306. It is to be understood that the analysis center operates as an automated controller of the closure-based discovery methodology. The system operates as follows.

We start with source A. Analysis center 306 sends the initial target set T to source A. Source A runs the closure algorithm and collects the data from the nodes in the network 302, then sends its closure target set T* and adjacency list back to the analysis center. Again, it is to be understood that an adjacency list is a way to describe the discovered topology as a list of all network links as the corresponding pairs of adjacent nodes, thus the adjacency list is different from the target list, i.e., adjacency list (for node A) specifies the discovered topology from node A.

This expanded target set in turn is sent, as the initial target set T, by the analysis center to source B. This process continues (to source C and so on) until the target list stops changing. Each time the analysis center receives the target set and adjacency list from one source, the analysis center updates them in the repository, does analysis and reporting.

As shown, the collected information is stored in repository 308. As further shown, the analysis center 306 utilizes services 310 to implement the topology discovery methodology. For instance, the traceroute data collector service obtains the information generated by each source after running the closure algorithm. The source coordinator service determines the sequence of sources that will run the closure algorithm. The analysis engine service provides analysis of the collected data, while the topology view plotter service generates the map (e.g., FIG. 2A) to be viewed via the graphical user interface 312.

In one embodiment, we implemented the closure algorithm and developed a tool for building the topology map. The tool includes a utility for the source machines. Running this utility first sets up the source as a socket server (or traceroute server), then allows the source to listen on the port. Once the source receives the initial set of targets from the remote analysis center, the source runs the algorithm to expand the target set until the target set is saturated (i.e., reached closure). The target set and adjacencies generated as the results are then sent back to the center via socket. The analysis center receives the results from one source and issues a request to the next source, and gradually builds the topology map and displays it as a graph in GUI. The multiple traceroute servers collaborate through the closure algorithm to provide a more complete map view.

Figure 4:
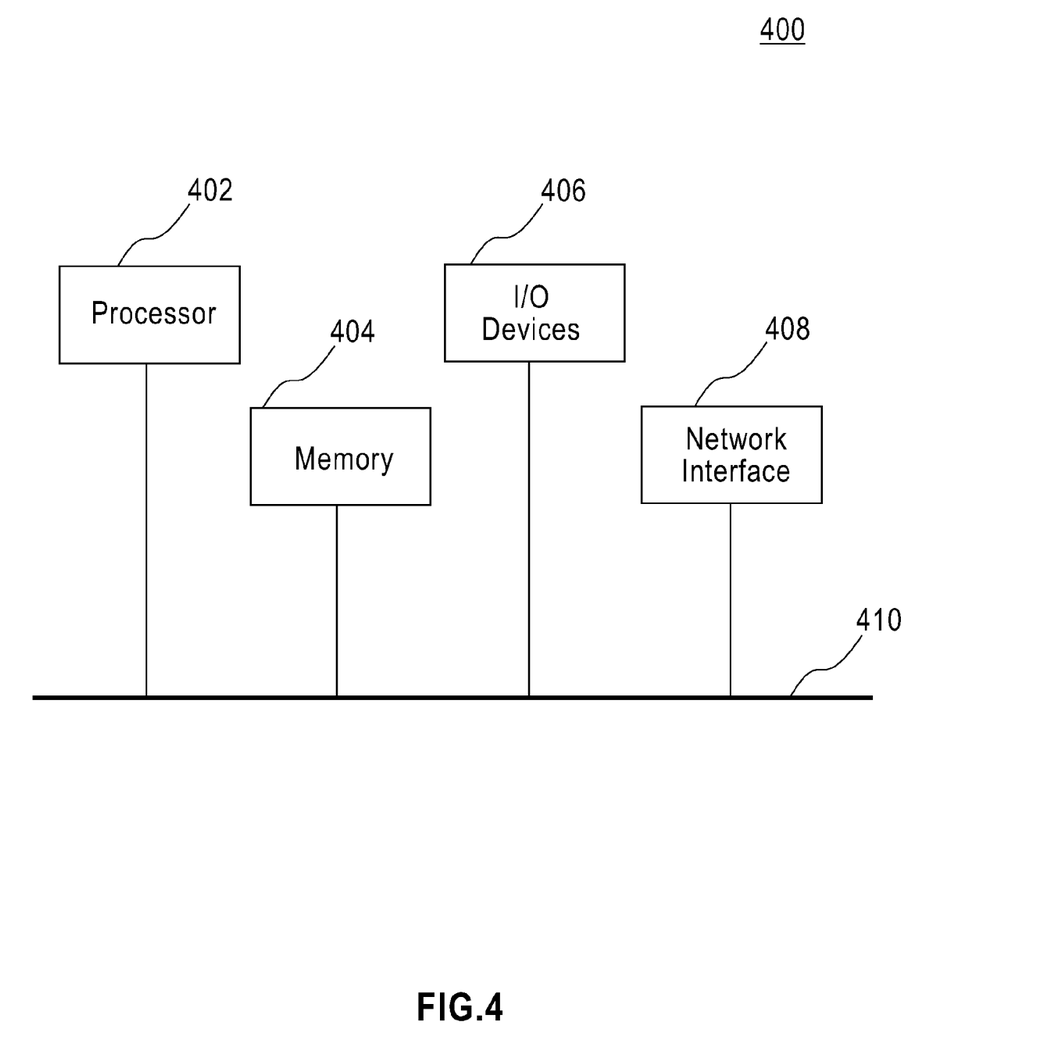
FIG. 4 is a diagram of a computer system in accordance with which one or more components/steps of a network topology discovery system may be implemented according to an embodiment of the invention.

FIG. 4 is a block diagram illustrating an illustrative hardware implementation of a computer system in accordance with which one or more components/steps of a network topology discovery system (e.g., components/steps described in the context of FIGS. 1 through 3) may be implemented, according to an embodiment of the present invention. For example, the illustrative architecture of FIG. 4 may be used in implementing any network nodes (source, intermediate, destination, target, etc.) and components of the analysis center.

Further, it is to be understood that the individual components/steps may be implemented on one such computer system, or more preferably, on more than one such computer system. In the case of an implementation on a distributed system, the individual computer systems and/or devices may be connected via a suitable network, e.g., the Internet or World Wide Web. However, the system may be realized via private or local networks. The invention is not limited to any particular network.

As shown, the computer system 400 may be implemented in accordance with a processor 402, a memory 404, I/O devices 406, and a network interface 408, coupled via a computer bus 410 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An automated method for discovering a topology of a network comprising a plurality of nodes, the method comprising the steps of:

performing a first traceroute process for a given source node and one or more destination nodes listed in a target list so as to discover one or more paths through one or more intermediate nodes between the given source node and the one or more destination nodes;

adding the one or more intermediate nodes discovered during the first traceroute process to the target list; and performing a second traceroute process for the given source node and the one or more intermediate nodes discovered during the first traceroute process so as to discover one or more paths through one or more additional intermediate nodes between the given source node and the one or more intermediate nodes discovered during the first traceroute process;

wherein: (i) when one or more additional intermediate nodes are discovered as a result of performance of the second traceroute process, adding the one or more additional intermediate nodes to the target list and performing at least one subsequent traceroute process to determine the existence of any further intermediate nodes; and (ii) when no new intermediate nodes are discovered as a result of performance of the second traceroute process or the at least one subsequent traceroute process, identifying the nodes in the target list as a target closure set for the given source node;

wherein the target closure set for the given source node is used as an initial target set for a next source node such that one or more traceroute processes can be performed to determine a target closure list for the next source node.

2. The method of claim 1, wherein a target closure set is generated for each subsequent source node selected in the network until the target closure set for a current source node is equal to the target closure set for a source node that is next with respect to the current source node.

3. The method of claim 2, wherein when the target closure set for the current source node is equal to the target closure set for a source node that is next with respect to the current source node, the target closure set for the current source node represents an overall closure set for the network.

4. The method of claim 3, wherein the overall closure set is usable to create a topology map of the network.

5. The method of claim 4, further comprising the step of displaying the topology map.

6. The method of claim 4, further comprising the step of updating the topology map as one or more target closure sets are updated.

7. An article of manufacture for discovering a topology of a network comprising a plurality of nodes, the article comprising a computer readable storage medium containing one or more computer programs, which when executed implement the steps of claim 1.

8. An automated method for discovering a topology of a network comprising a plurality of nodes, the method comprising the steps of:
- sending an initial target set to a first source node such that the first source node runs a closure algorithm, beginning with the initial target set, which iteratively executes multiple traceroute processes until no new target nodes are discovered resulting in a closure target set for the first source node;
- collecting the closure target set from the first source node;
- sending the closure target set collected from the first source node to a second source node for use as an initial target set to be used to run the closure algorithm so as to generate a closure target set for the second source node;
- collecting the closure target set from the second source node; and
- continuing the sending and collecting steps to one or more other source nodes until the closure target set returned for a current source node is the same as the closure target set for a previous source node thus resulting in an overall target closure set.

9. The method of claim 8, further comprising a step of analyzing the overall target closure set.

10. The method of claim 8, further comprising a step of generating a topological representation of the network using the overall target closure set.

11. The method of claim 10, further comprising a step of displaying the topological representation of the network.

12. The method of claim 10, further comprising a step of updating the topological representation of the network when the overall target closure set changes.

13. Apparatus for use in a network node for discovering a topology of a network comprising a plurality of nodes, the apparatus comprising:
- a memory; and
- a processor coupled to the memory and operative to:
  - perform a first traceroute process for a given source node and one or more destination nodes listed in a target list so as to discover one or more paths through one or more intermediate nodes between the given source node and the one or more destination nodes;
  - add the one or more intermediate nodes discovered during the first traceroute process to the target list; and
  - perform a second traceroute process for the given source node and the one or more intermediate nodes discovered during the first traceroute process so as to discover one or more paths through one or more additional intermediate nodes between the given source node and the one or more intermediate nodes discovered during the first traceroute process;
- wherein: (i) when one or more additional intermediate nodes are discovered as a result of performance of the second traceroute process, adding the one or more additional intermediate nodes to the target list and performing at least one subsequent traceroute process to determine the existence of any further intermediate nodes; and (ii) when no new intermediate nodes are discovered as a result of performance of the second traceroute process or the at least one subsequent traceroute process, identifying the nodes in the target list as a target closure set for the given source node;
- wherein the target closure set for the given source node is used as an initial target set for a next source node such that one or more traceroute processes can be performed to determine a target closure list for the next source node.

14. The apparatus of claim 13, wherein a target closure set is generated for each subsequent source node selected in the network until the target closure set for a current source node is equal to the target closure set for a source node that is next with respect to the current source node.

15. The apparatus of claim 14, wherein when the target closure set for the current source node is equal to the target closure set for the source node that is next with respect to the current source node, the target closure set for the current source node represents an overall closure set for the network.

16. A system for discovering a topology of a network comprising a plurality of nodes, the system comprising:
- a memory; and
- a controller coupled to the memory and operative to:
  - send an initial target set to a first source node such that the first source node runs a closure algorithm, beginning with the initial target set, that iteratively executes multiple traceroute processes until no new target nodes are discovered resulting in a closure target set for the first source node;
  - collect the closure target set from the first source node;
  - send the closure target set collected from the first source node to a second source node for use as an initial target set to be used to run the closure algorithm so as to generate a closure target set for the second source node;
  - collect the closure target set from the second source node; and
  - continue the sending and collecting operations to one or more other source nodes until the closure target set returned for a current source node is the same as the closure target set for the a previous source node thus resulting in an overall target closure set.

17. The system of claim 16, wherein the controller is further operative to analyze the overall target closure set.

18. The system of claim 16, wherein the controller is further operative to generate a topological representation of the network using the overall target closure set.

* * * * *